United States Patent [19]

Sakka et al.

[11] Patent Number: 4,584,837
[45] Date of Patent: Apr. 29, 1986

[54] METHOD OF AND APPARATUS FOR DEAERATING CONDENSATE IN POWER GENERATING STEAM TURBINE PLANT

[75] Inventors: Kenji Sakka; Taiji Inui, both of Hitachi; Ryoichi Okura, Takahagi; Masao Kanazawa, Ibaraki; Yasushi Takeda, Hitachi, all of Japan

[73] Assignees: Hitachi, Ltd.; Hitachi Engineering Co., Ltd., both of Tokyo, Japan

[21] Appl. No.: 541,247

[22] Filed: Oct. 12, 1983

[30] Foreign Application Priority Data

Oct. 13, 1982 [JP] Japan .................................. 57-178356

[51] Int. Cl.[4] ............................................ F01K 13/02
[52] U.S. Cl. ...................................... 60/646; 60/657; 60/685
[58] Field of Search ................. 60/646, 656, 657, 685, 60/693, 698; 122/406 ST

[56] References Cited

U.S. PATENT DOCUMENTS

| 3,338,053 | 8/1967 | Gorzegno et al. | 60/646 |
| 4,130,992 | 12/1978 | Bitterlich et al. | 60/646 X |
| 4,311,013 | 1/1982 | Kuribayashi et al. | 122/406 ST |

Primary Examiner—Stephen F. Husar
Attorney, Agent, or Firm—Antonelli, Terry & Wands

[57] ABSTRACT

A method of and apparatus for deaerating condensate in a power generating steam turbine plant of the type having deaeration system making use of the deaeration function of the condenser of the plant. The non-deaerated condensate in the condenser of the steam turbine plant to be started is substituted by deaerated condensate supplied from an equipment containing deaerated condensate such as the condenser of another plant under operation and deaerated condensate storage tank. The non-deaerated condensate can be deaerated in a short period to the level required for the feedwater supplied to the boiler, of the steam turbine plant.

4 Claims, 7 Drawing Figures

METHOD OF AND APPARATUS FOR DEAERATING CONDENSATE IN POWER GENERATING STEAM TURBINE PLANT

BACKGROUND OF THE INVENTION

The present invention relates to a method and apparatus for deaeration of condensate in a power generating steam turbine plant, and, more particularly to a combined cycle plant of the type in which the condensate is deaerated in a condenser so as to permit a quick start up of the turbine plant.

Generally, in a steam turbine plant, of, for example, an electric power generation plant, it is necessary to deaerate the condensate before it is fed as the feedwater to the boiler, in order to prevent the boiler from being corroded by the gases, particularly oxygen, dissolved in the condensate. The oxygen content of the condensate in the condenser of such plants is generally high and well reaches a very high value of 7000 ppb at the maximum particularly when the plant is not operating. On the other hand, in order to prevent the corrosion of the boiler, it is required that the oxygen content of the feedwater is on the order of 5 to 10 ppb. When the plant is started, therefore, it is necessary to deaerate the condensate to decrease the oxygen content to the required low level. To this end, steam turbine plant is usually provided with a deaerator for deaerating the condensate before the condensate is fed as the feedwater to the boiler. In some types of power generating plants, however, the deaerator is omitted and the deaeration of the condensate is made by the deaeration effect produced by the condenser. An example of such types of the steam turbine plant is the combined cycle in which the cycle efficiency of steam turbine is improved by an efficient use of heat wasted from a gas turbine. In such a steam turbine plant, therefore, a considerably long time is required for deaerating the boiler feedwater, i.e. the condensate, to reduce the oxygen content to the required level to make it difficult to quickly start up the plant as a whole.

In order to overcome this problem, it has been proposed that the condensate from the condenser is recycled to the condenser, while the inside of the condenser is depressurized to a vacuum by an air ejector and auxiliary steam is introduced into the condenser to heat the condensate, to thereby promote the deaeration by the condenser. This measure, however, is still unsatisfactory in that a long period of time is required for the recirculation of the condensate thereby impeding the quick start up of the plant, although the time length required for the start up is shortened to some extent. This problem is serious particulary in the case of power generating steam turbine plant of the combined cycle type. Namely, such type of steam turbine plant cannot cope with the demand for the quick start up although it is required to operate as a middle plant from the view point of the performance thereof.

Another solution to this problem is proposed in Japanese Patent Laid-Open No. 112811/1980, wherein a storage tank is employed for storing deaerated condensate and a storage tank for storing make-up water before deaeration. In the beginning period of starting up of the steam turbine plant, the deaerated condensate is supplied from the first-mentioned tank to the boiler, while the make-up water is recycled between the condenser and the second-mentioned tank so as to be progressively deaerated. When the oxygen content of the water in the condenser has come down to the required low level, the feedwater line to the boiler is switched to the normal line. This method, however, cannot speedup the starting of the plant because the deaeration is made through recirculating of the make-up water. In addition, since the feedwater is supplied from the first-mentioned tank for storing deaerated condensate for a long time until the make-up water in the condenser is deaerated sufficiently, the tank is required to have an impratically large capacity.

Accordingly, an object of the invention is to provide, in a power generating steam turbine plant in which the condensate is deaerated by a condenser, a deaeration method which permits a quick deaeration of the condensate and, hence, a quick start up of the steam turbine plant.

Another object of the invention is to provide a condensate deaeration method which permits a quick start up of a power generating steam turbine plant of condenser deaeration type, particularly combined cycle plant, capable of realizing a diversification of operation of the power generating plant.

Still another embodiment of the invention is to provide a condensate deaeration apparatus suitable for use in carrying out the above-mentioned method.

A further object of the invention is to provide a condensate deaeration apparatus which can remarkably shorten the time required for starting up of the turbine plant at a low cost, without requiring substantial change in the construction of the conventional power generating steam turbine plant.

To this end, according to one aspect of the invention, a condensate deaerating method is provided for use in starting at least one power generating steam turbine plant, wherein before starting up the plant, a condensate is substituted in an equipment possessing deaerated condensate for the condensate in the condenser of the plant to be started and the substituted condensate is supplied to the boiler, to thereby permit a quick start up of the steam turbine plant.

According to another aspect of the invention, a condensate deaeration apparatus for use in a system having a plurality of power generating steam turbine plants is provided which includes a first communication means for providing a communication between the plants and is adapted to introduce deaerated condensate from the condenser of at least one of the plants under operation to the condenser of at least one of the plants which is to be started. A second communication means provides a communication between the plants and is adapted to introduce non-deaerated condensate from the condenser of the at least one of the plants to be started to the condenser of the at least one of plants under operation. A valve means selectively operates the first and second communication means, whereby the non-deaerated condensate possessed by the condenser of the plant to be started is substituted by the deaerated condensate possessed by the condenser of the plant under operation, to thereby permit a quick deaeration of the condensate in the plant to be started.

These and other objects, features and advantages of the invention will become clear from the following description of the preferred embodiments when the same is read in conjunction with the accompanying drawings.

DETAILED DESCRIPTION

Figure 1:
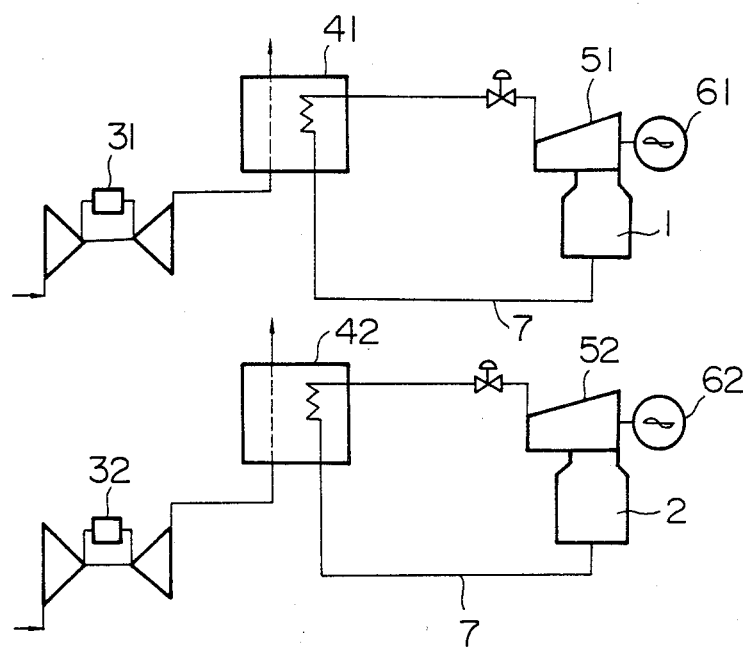
FIG. 1 is a schematic system diagram of a power generating steam turbine plant having a plurality of combined cycle plants to which the invention pertains.

Referring now to the drawings wherein like reference numerals are used throughout the various views to designate like parts and, more particularly, to FIG. 1, according to this figure, a combined plant having at least two steam turbine plants, exhaust gas boilers 41, 42 adapted to generate steam by the gas wasted from gas turbines 31, 32. The steam is used for driving steam turbines 51, 52 which, in turn, drive generators 61, 62 connected to the steam turbines 51, 52. The steam coming out of the steam turbines 51, 52 is condensed to become condensate in respective condensers 1, 2 and the condensate is fed as feedwater to the boilers 41, 42 through condensate lines 7.

Figure 7:
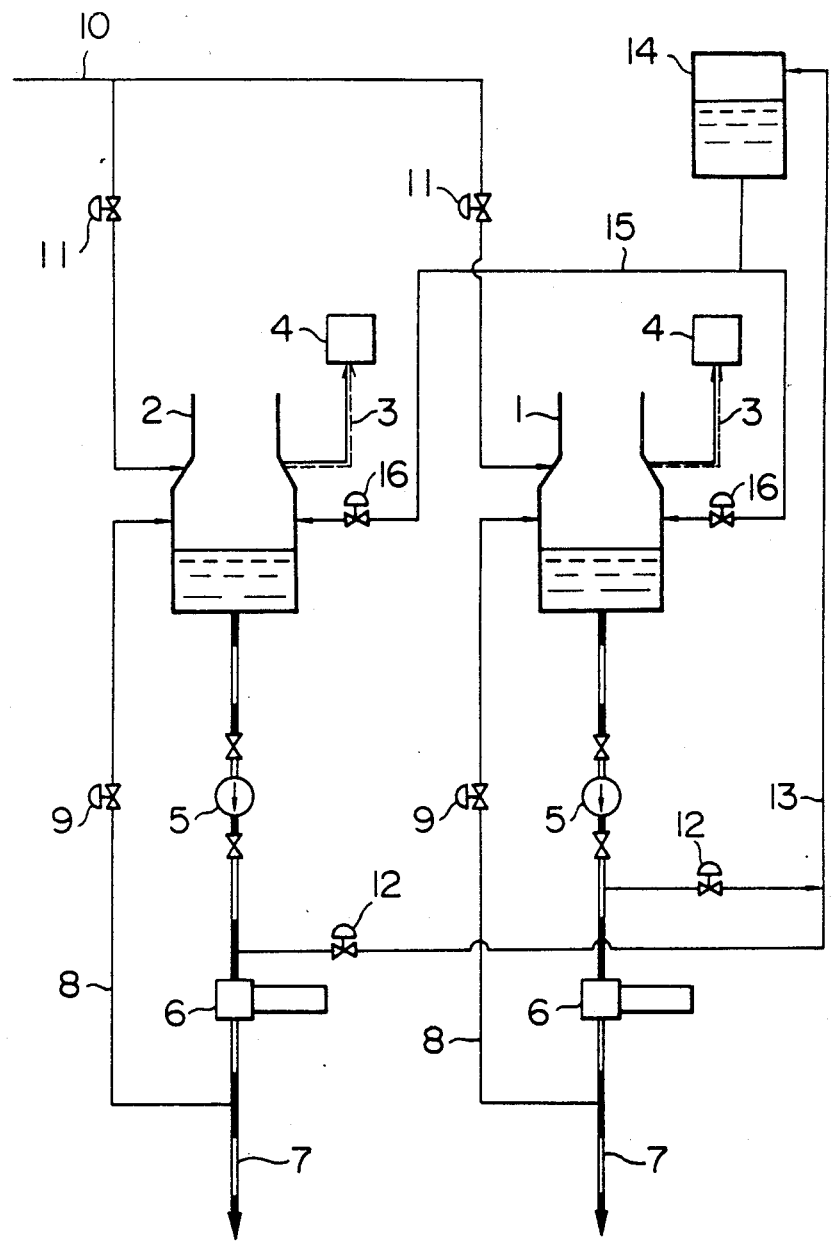
FIG. 7 is a system diagram of a conventional condensate deaeration apparatus for power generating steam turbine plant.

The conventional deaeration function of the condenser will be explained hereinbelow with specific reference to FIG. 7, before turning to the description of embodiments of the present invention. More particularly, as shown in FIG. 7, the condensers 1, 2 are connected to air ejectors 4, 4 through air ejecting lines 3, 3. Condensate lines 7, 7 are connected to the bottoms of respective condensers 1, 2 for feeding the condensate to corresponding boilers. Each condensate line 7 is provided with a condensate pump 5 and a gland condenser 6. A condensate recirculating line 8 having a condensate recirculating valve 9 branches off the condensate line 7 at a portion thereof downstream from the gland condenser 6. The condensate recirculating line 8 is adapted to recirculate a part of the condensate to each condenser 1 or 2. A spill-over line 13 having a spill-over valve 12 is connected to a portion of each condensate line 7 downstream from the condensate pump 5. The spill-over line 13 is adapted to introduce the surplus condensate to a common condensate storage tank 14. Make-up water lines 15 having make-up water regulating valves 16 are connected between the condensate storage tank 14 and respective condensers 1, 2, so that condensate in the storage tank 14, is supplied as make-up water to respective condensers as necessitated. Auxiliary steam is introduced from a boiler into the condensers 1, 2 through an auxiliary steam line 10 having auxiliary steam regulating valves 11 to thereby heat the condensate in the condenser.

The power generating steam turbine plant having the condenser system of the construction described hereinabove is started up in the following manner.

Namely, referring to the plant having the condenser 2 by way of example, at first the condensate pump 5 is started and the condensate recirculating valve 9 is opened so that the condensate in the condenser before the deaeration is recirculated to the condenser 2 through the condensate line 7 and the condensate recirculating line 8. Meanwhile, the auxiliary steam regulating valve 11 is opened to introduce the auxiliary steam into the condenser 2 to heat the condensate in the condenser 2. On the other hand, the air ejector 4 is operated to establish and maintain a high vacuum in the condenser 2 to promote the deaeration of the condensate. This deaerating operation is continued until the content of oxygen dissolved in the condensate is lowered to the level of 5 to 10 ppb which is an essential requisite for the feedwater supplied to the boiler. Thereafter, the water is fed to the boiler and the plant as a whole is started.

Figure 2:
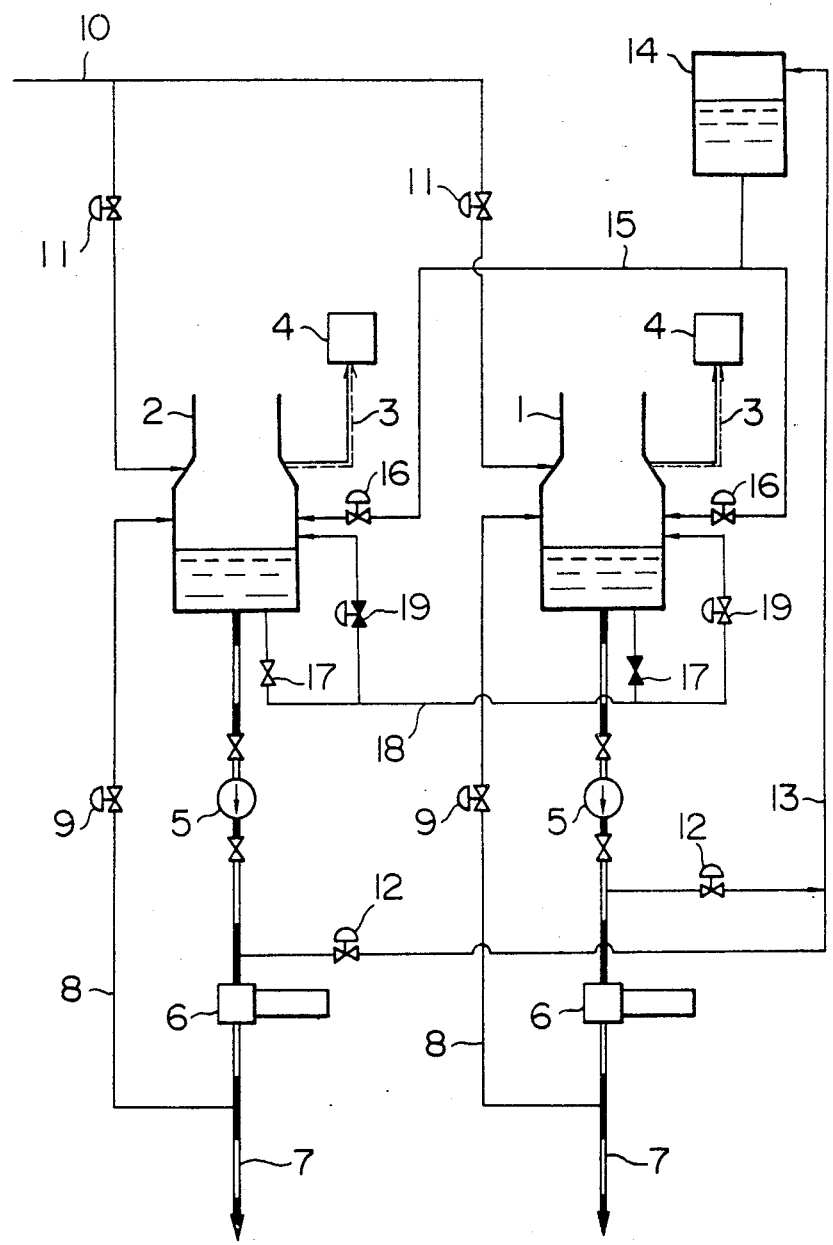
FIG. 2 is a system diagram of a condensate deaeration apparatus for power generating steam turbine plant, constructed in accordance with an embodiment of the invention.

In accordance with the present invention, as shown in FIG. 2, as in FIG. 7, only the condenser and condensate deaeration system are shown with the difference between FIGS. 2 and 7 residing in the fact that the condensers are communicated with each other through communication means which is selectively put into operation by means of valve means, so that the non-deaerated condensate contained by the condenser to be started is mixed with the deaerated condensate in the condenser under operation. Other portions of FIG. 2 are materially identical to those of the conventional arrangement shown in FIG. 7 and, therefore, is not described here. More specifically, the communication means includes a condenser communication line 18 which is branched at its each end into a line opening into the bottom of each condenser and a line opening to a portion above the condensate surface in each condenser. These branch lines are provided with a condenser communication valve 17 and a condensate control valve 19, respectively.

In this condensate deaeration system, in order to reduce the oxygen content down to the required level of 10 to 5 ppb, the condensate before the deaeration is deaerated in accordance with the following procedure.

As in the case of FIG. 7, it is assumed here that the plant having the condenser 1 has been started already and the plant having the condenser 2 is going to be started. As the condensate pump 5 is started, the condensate in the condenser 2 of the plant to be started is taken out of the condenser 2 and is recirculated through the condensate recirculating line 8 branching from the condensate line 7 at the downstream side of the gland condenser 6, past the condensate recirculating valve 9. Then, as the condenser communicating valve 17 is opened, the condensate in the condenser 2 to be started is introduced through the condenser communicating line 18 into the condenser 1 under operation at a flow rate regulated by the condensate control valve 19 due to the pressure differential between the condenser 1 and the condenser 2, because a high vacuum has been established in the condenser 1 under operation. Consequently, the non-deaerated condensate, i.e. the condensate having a large content of dissolved oxygen is introduced into the condenser 1 under operation. This, however, does not impose any problem because the flow rate of the condensate introduced into the condenser 1 under operation is controlled by the condensate control valve 19 such that the content of the oxygen dissolved in the mixture of the condensate in the condenser 1 does not exceed 10 ppb. As a result of the introduction of the condensate from the condenser 2 to be started, the level of the condensate rises in the condenser 1 under operation. The surplus condensate, however, is collected in the condensate storage tank 14 through the spill-over valve 12 and the spill-over line 13. On the other hand, the level of the condensate in the condenser 2 to be started is lowered due to the supply of the condensate to the condenser 1. Therefore, in order to recover the condensate level in the condenser 2 to be started, condensate is supplied as the make-up water from the condensate storage tank 14, through the make-up water line 15 past the make-up water valve 16. Since the condensate storage tank 14 is continuously supplied through the spill-over line 13 with the condensate having oxygen content of the required low level, no increase of the oxygen content takes place in the condensate in the condenser 2.

Various methods can be used for controlling the rate of supply of the non-deaerated condensate into the condenser 1 under operation to maintain the oxygen content of the mixture condensate in the latter within the required range. For instance, the condensate control valve 19 is sequentially controlled in accordance with the allowable mixing rate which in turn is determined in relation to the turbine output power. According to another method, the condensate control valve 19 is pre-adjusted at the time of the trial of the plant, such that the valve 19 performs a sequence control in accordance with the quality (oxygen content) of the condensate detected by a water analyzer mounted in the condenser or in the condensate line.

The condensate in the condenser 2 to be started is recirculated while being partially substituted by the condensate produced in the condenser 1 under operation. At the same time, steam is introduced into the condenser 2 through the auxiliary steam line 10 and the auxiliary steam regulating valve 11, while the vacuum in the condenser 2 is gradually increased by the operation of the air ejector 4. Thus, in the embodiment of FIG. 2, the deaeration of the condensate in the condenser to be started is promoted effectively by the combined effect of the recirculation of the condensate, partial substitution by the deaerated condensate, heating by the auxiliary steam and the vacuum produced by the air ejector, so that the time required for the deaeration is shortened remarkably.

Figure 3:
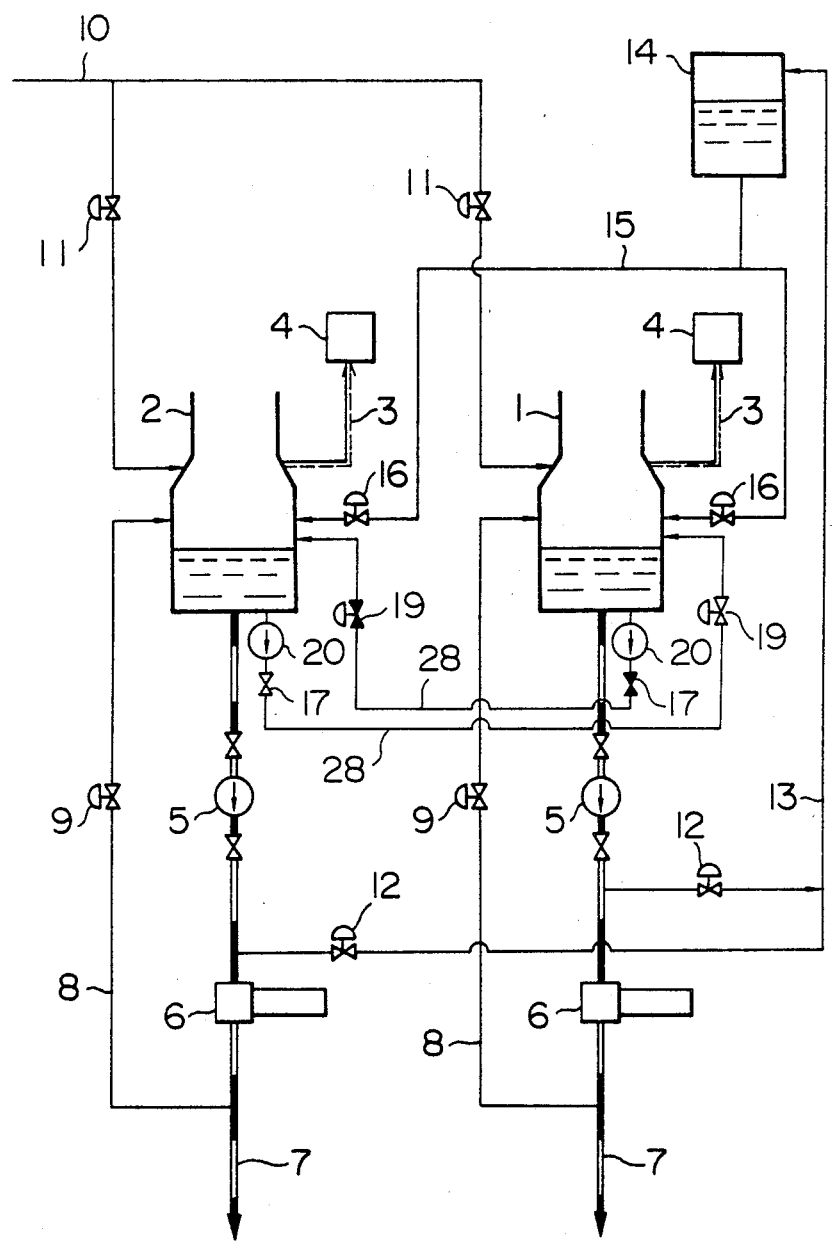
FIGS. 3 to 6 are system diagrams of condensate deaeration apparatus for power genrating steam turbine plant, constructed in accordance with different embodiments of the invention.

The embodiment of FIG. 3 is similar to the embodiment of FIG. 2 in that a system is provided for permitting the substitution of the condensate in the condenser 2 to be started by the condensate in the condenser 1 under operation, i.e. a system having condenser communicating valves 17, condenser communicating lines 28 and condensate regulating valves 19. The embodiment shown in FIG. 3 is characterized by the provision of a condensate substitution pump 20 disposed in the above-mentioned system for permitting the substitution of condensate. In the embodiment of FIG. 3, the substitution of the condensate is possible even when the differential of pressure between two condensers is too small to cause the substitution of the condensate. In addition, the substitution of the condensate can be made more promptly. Although in the embodiment of FIG. 3 two independent condenser communicating lines 28 are used, it is possible to simplify the piping by arranging such that these condenser communicating lines 28 have a common intermediate portion.

Figure 4:
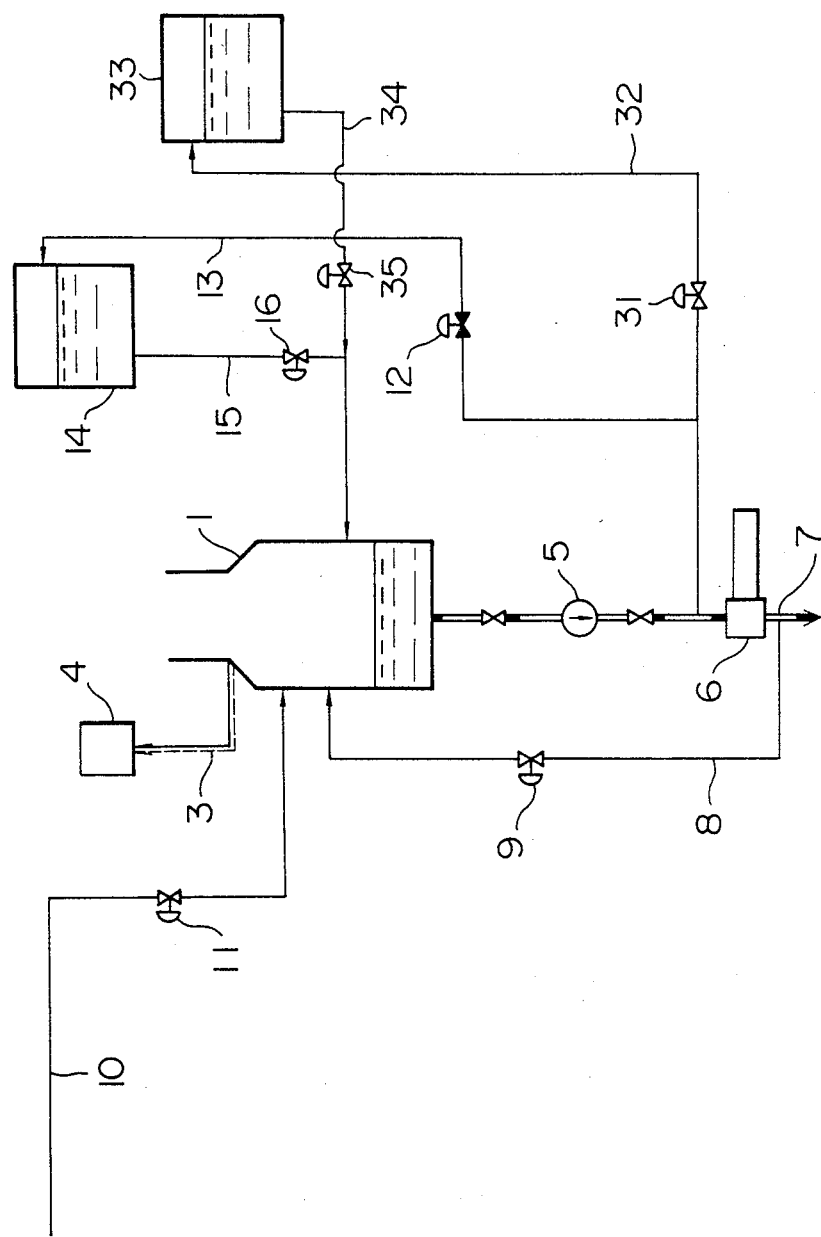

In the embodiment of FIG. 4 the condensate deaeration method of the invention can be applied even to a single steam turbine plant. Therefore, the embodiment of FIG. 4 can be used in combination with one of the embodiments of FIGS. 2 and 3 such that the deaeration of the condensate in the plant which is to be started first is conducted in accordance with the embodiment of FIG. 4, while the deaeration in other plant or plants is conducted in accordance with the either the embodiments of FIG. 2 or 3.

Referring to FIG. 4, an open tank 33 is used as means for accomodating the non-deaerated condensate, with tank 33 being connected, through an initial spill-over line 32, to the portion of the spill-over line 13 upstream from the spill-over valve 12. The open tank 33 is connected through a secondary make-up line 34 to the portion of the make-up water line 15 downstream from the make-up water regulating valve 16. The initial spill-over line 32 and the secondary make-up water line 34 are provided with an initial spill-over valve 31 and a secondary make-up water valve 35, respectively.

In the operation of the embodiment of FIG. 4, the condensate in the condenser 1 having a large oxygen content is discharged through the initial spill-over line 32 to the open tank 33 by means of the condensate pump 5. On the other hand, the make-up water in the condensate storage tank 14 has the oxygen content of the required low level. Therefore, the deaeration in the condenser is promoted by supplying the make-up water to the condenser through the make-up water line 15 and the make-up water regulating valve 16 to make up for the water lost by the discharge to the open tank 33. In this operation, the spill-over valve 12 is fully closed so that the discharged water is wholly collected by an open tank 33.

Thus, during the deaeration of the condenser, the condensate having a high content of dissolved oxygen is discharged from the condenser 1 into the open tank 33, while the condensate having small oxygen content is supplied from the condensate storage tank 14 to the condenser 1. Consequently, the amount of the condensate in the condensate storage tank 14 is decreased while the amount of condensate in the open tank 33 is increased. In this embodiment, therefore, after the completion of the deaeration in the plant, the condensate having small oxygen content is collected in the condensate storage tank 14 through the spill-over valve 12 and the spill-over line 13 and, at the same time, the surplus condensate in the open tank 33 is introduced into the condenser 1 through the secondary make-up water line 34, while controlling the flow rate by means of the secondary make-up water valve 35 in such a manner that the oxygen content of the condensate held in the condenser 1 is maintained within the required range of oxygen content.

Thus, the condensate in the condenser 1 is substituted by the make-up water from the condensate storage tank 14. Simultaneously, the auxiliary steam is introduced into the condenser 1 through the auxiliary steam line 10 past the auxiliary steam regulating valve 11 and the vacuum in the condenser 1 is gradually increased by the operation of the air ejector 4. Consequently, the deaeration of the condensate is accelerated to remarkably shorten the time required for the deaeration.

Figure 5:
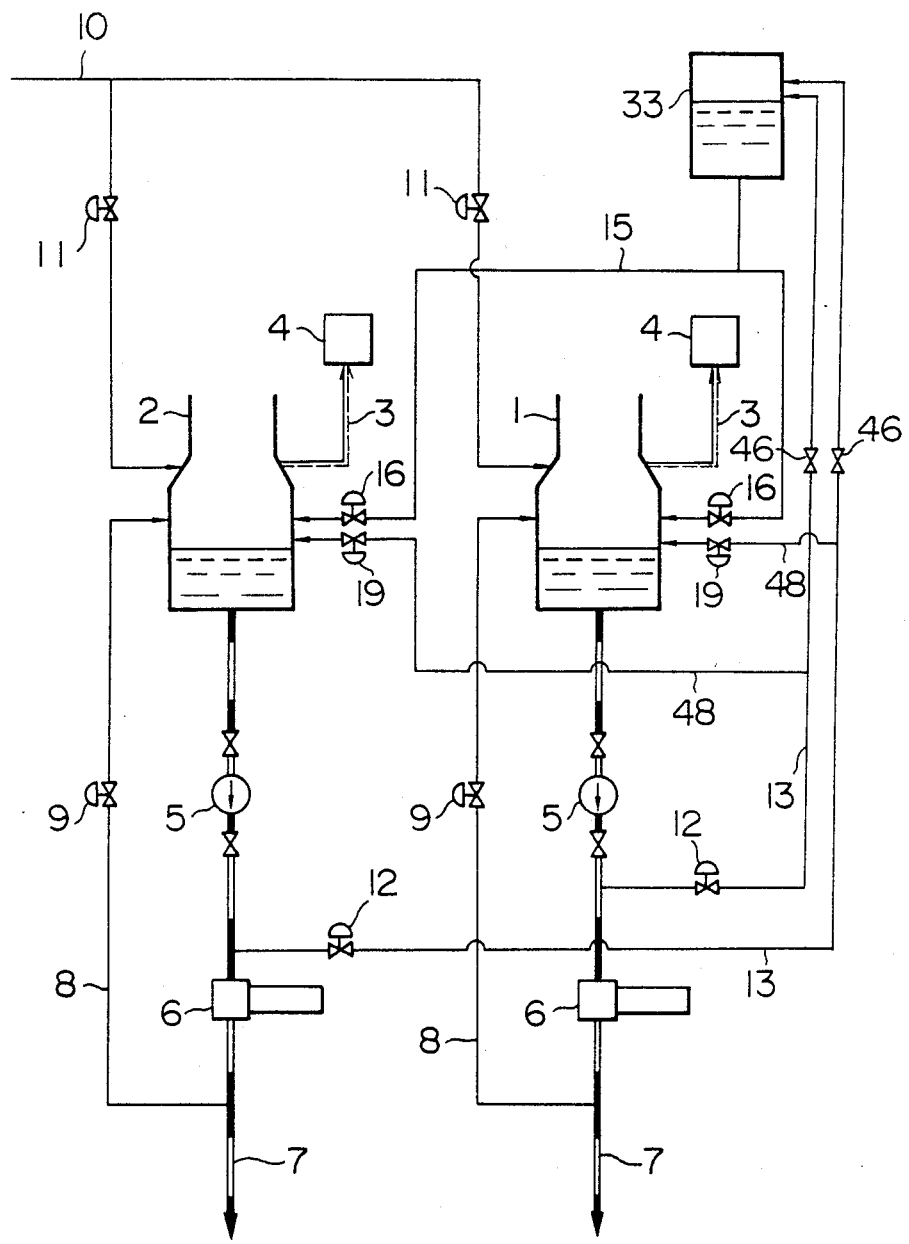

In FIG. 5 an embodiment of the invention is illustrated which is suitable for use in starting up a steam turbine plant while another plant has been already started and operating; however, only the condenser and associated parts, as well as the condensate deaeration system are shown in FIG. 5.

The condensate deaeration system of the embodiment of FIG. 5 is basically identical to that of the prior art, but is distinguished from the conventional arrangement in that, in order to permit a part of the condensate in the condenser 1 under operation to be mixed with the condensate in the condenser which is to be started, a communication line 48 is branched from each spill-over line 13 at the downstream side of the spill-over valve 12 and connected to each condenser. In addition, a spill-over stop valve 46 is disposed in the portion of the spill-over line 13 downstream from the branching point of the communication line 48. An open tank 33 constitutes the means for storing surplus condensate.

In the operation of the embodiment of FIG. 5, the condensate pump 5, associated with the condenser 2 to be started, is started so that the condensate thereof is recirculated through the condensate recirculating line 8 as the condensate recirculating valve 9 is opened. At the same time, the spill-over valve 12 and the condensate control valve 19 associated with the spill-over system of the condenser 1 under operation are opened so that a part of the condensate in the condenser 1 is introduced into the condenser 2 to be started through the spill-over line 13 and the communicating line 48 at a rate controlled by the condensate control valve 19. Since deaerated condensate is introduced into the condenser 2 from the condenser 1, a surplus condensate is generated in the condenser 2 to be started. As the spill-over valve 12 and the spill-over stop valve 46 associated with the condenser 2 are opened, this surplus condensate is introduced into the open tank 33 through the spill-over line 13 at a rate controlled by the spill-over valve 12.

On the other hand, the amount of the condensate in the condenser 1 under operation is decreased because a part of this condensate is shifted to the condenser 2 to be started. In order to make up for this loss of condensate, the condensate is supplied from the open tank 33 to the condenser 1 through the make-up water line 15 and the make-up water regulating valve 16. Although the condenser 1 under operation receives the make-up water rich in oxygen from the open tank 33, it does not matter substantially because the rate of the condensate to be substituted is controlled by the make-up water regulating valve 16 and the condensate control valve 19 such that the oxygen content of the condensate in the condensate held by the condenser 1 is always maintained within the required range. Therefore, according to the embodiment of FIG. 5, it is possible to accomplish the deaeration of the condensate in the condenser 2 without deteriorating the quality of th condensate in the condenser 1 under operation.

Figure 6:
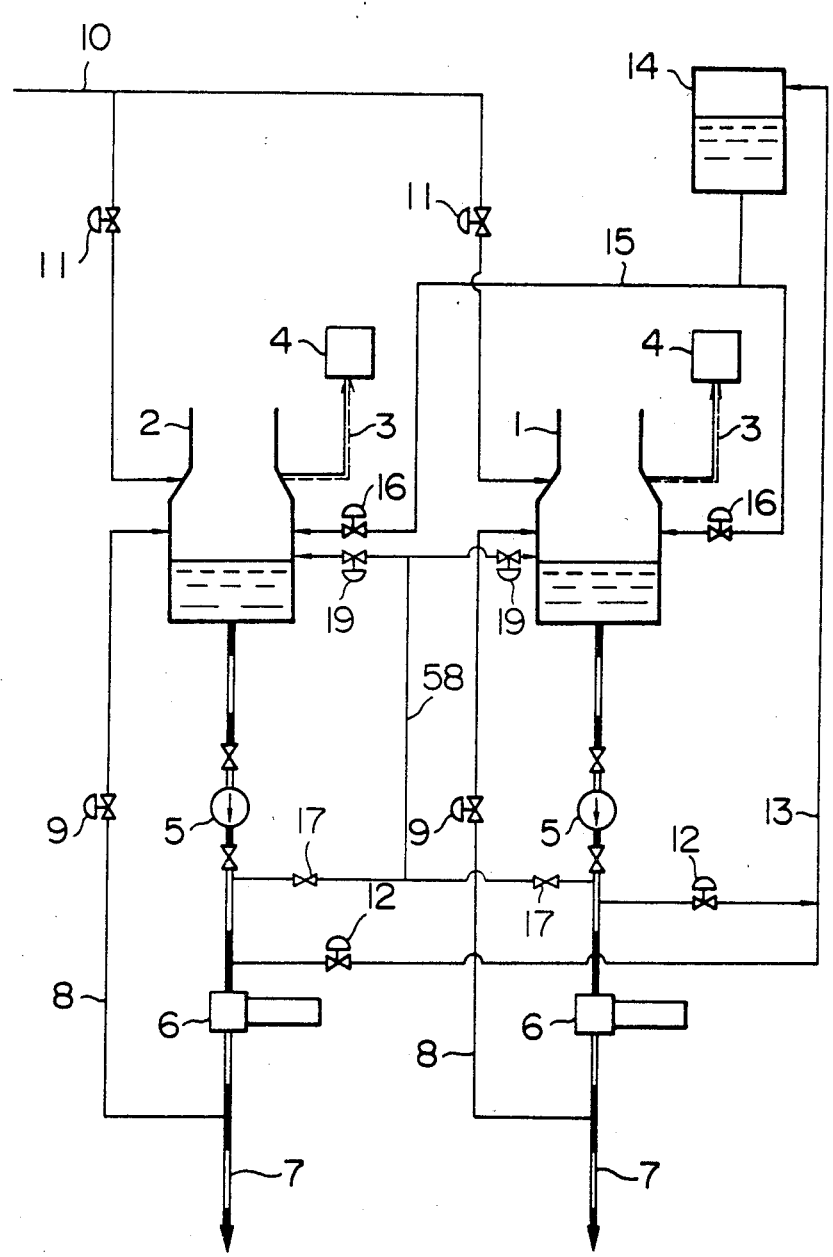

The embodiment of FIG. 6 is similar to those shown in FIGS. 2 and 3 except that a condenser communicating line is provided to permit the deaerated condensate to be supplied from the condenser under operation into the condenser which is to be started. The condenser communicating line 58 is connected between the condenser and the condensate line connected to each condenser. More specifically, the condenser communicating line 58 has a first portion which is connected at its one end to the condensate line 7 of the condenser 2 at a portion between the condensate pump 5 and the point at which the spill-over line 13 branches and connected at the other end to the condenser 1, and a second portion which provided a communication between both condensers in the same manner as the first portion. Each of these portions is provided with a condensate control valve 19 and a condenser communication valve 17. Both portions are connected to each other at their portions intermediate between the condensate control valve 19 and the condenser communication valve 17.

In the embodiment of FIG. 6, the deaerated condensate in the condenser 1 under operation is introduced into the condenser 2 through the condensate line 7 and the communication line 58, while the condensate before the deaeration held by the condenser 2 to be started is introduced into the condenser 1 under operation through the spill-over line 13 and the make-up water line 15, so that a mutual exchange or substitution of the condensate is made between two condensers, so that the deaeration of the condensate in the condenser to be started is accelerated to permit a quick start up of the steam turbine plant.

As will be understood from the foregoing description of the preferred embodiments, when a power generating steam turbine plant is started, the deaerated condensate in a suitable equipment such as the condenser of another plant under operation can be substitued for the non-deaerated condensate in the condenser of the plant which is to be started. Consequently, the time length is shortened remarkably for deaerating the condensate in the newly started plant to the level required for the feedwater fed to the boiler, thereby to permit a quick start up of the steam turbine power plant. For information, two to three recirculation cycles of the condensate in the condenser, taking about 1.5 hour, is required for the sufficient deaeration in the plant combined with a 70 MW gas turbine and possessing about 8 m$^3$ of condensate. In contrast, according to the invention, it is possible to mix the non-deaerated condensate with the condensate in the condenser under operation at a mixing ratio of about 50% to the condensate from the staem discharged by the steam turbine and, therefore, the time length required for the deaeration is shortened remarkably to about twenty minutes in the case of the above-mentioned combined plant discharging the steam of about 140 ton/h. Furthermore, according to the invention, it is possible to achieve these advantageous effects at a low cost by an addition of a simple system without requring any substantial change in the existing steam turbine plant.

What is claimed is:

1. A condensate deaerating method for use in starting a plurality of power generating steam turbine plants, each of said plants having a boiler for generating steam by heating a condensate supplied thereto, a steam turbine connected to a generator and adapted to drive said generator by the expansion of said steam therethrough, and a condenser for condensing the steam expanded through said steam turbine and supplying the condensate to said boiler, the condensate dearation method comprising:

substituting, before starting up the plant to be started, a condensate in equipment possessing deaerated condensate for the condensate in said condenser of the plant to be started and supplying the substituted condensate to the boiler to thereby permit a quick start-up of the steam turbine plant, and, wherein said equipment possessing deaerated condensate is the condenser of one of the steam generating plant under operation.

2. A condensate deaeration apparatus for use in a system having a plurality of power generating system turbine plants, each of said plants having a boiler for generating steam by heating a condensate supplied thereto, a steam turbine connected to a generator and adapted to drive said generator by the expansion of said steam therethrough, and a condenser for condensing the steam expanded through said steam turbine and supplying the condensate to said boiler, said condensate deaeration apparatus comprising:

first communication means for providing communication between said plants and being adapted for introducing deaerated condensate from the condenser of at least one of said plants under operation to the condenser of at least one of said plants which is to be started;

second communication means for providing communication between said plants and adapted to introduce non-deaerated condensate from said condenser of said at least one of said plants to be started to the condenser of said at least one of plants under operation; and valve means for selectively operating said first and second communication means;

whereby the non-deaerated condensate possessed by said condenser of said plant to be started is substituted by the deaearated condensate possessed by said condenser of said plant under operation, to thereby permit a quick deaeration of said condensate in said plant to be started.

3. A condensate deaeration apparatus according to claim 2, wherein said plurality of plants include a plurality of spill-over lines branching from condensate lines between respective condensers and associated boilers and connected to at least one common open tank through respective spill-over valves and spill-over stop valves, respectively, and a plurality of make-up water lines connected between said open tank and said condensers through make-up water regulating valves, respectively, each of said condensate lines having a condensate pump and a gland condenser, each of said spill-over lines branching from the portion of corresponding condensate line downstream from said condensate pump, said apparatus further comprising a plurality of condenser communication lines each having a condensate control valve and providing a communication between the portions of respective spill-over lines between said spill-over valve and said spill-over stop valve and respective condensers, said first communication means including said spill-over line and said condenser communication line connecting said condenser of said plant under operation to said condenser of said plant to be started up, said second communication means including said spill-over line, said open tank and said make-up water line connecting said condenser of said plant to be started to said condenser of said plant under operation.

4. A condensate deaeration apparatus according to claim 3, further comprising: recirculating means for recirculating the condensate in each plant, said recirculation having a condensation recirculating line branching from said condensate line at a portion of the latter downstream from said gland condenser and connected to each condenser through a condensate recirculating valve; a heating means for heating said condensate in each condenser and including an auxiliary steam line connected between a source of heating auxiliary steam and each condenser and having an auxiliary steam regulating valve, to thereby introduce the heating auxiliary steam to said condenser; and an air ejecting means including an air ejector connected to each of said condensers.

* * * * *